United States Patent

[11] 3,581,267

| [72] | Inventor | Robert Z. Schreffler<br>Chester, Va. |
|---|---|---|
| [21] | Appl. No. | 752,666 |
| [22] | Filed | Aug. 14, 1968 |
| [45] | Patented | May 25, 1971 |
| [73] | Assignee | Electric Conductor Bearings, Incorporated<br>Chester, Va.<br>Continuation-in-part of application Ser. No.<br>562,956, June 30, 1966. |

[54] ELECTRIC CONDUCTOR BEARINGS
10 Claims, 4 Drawing Figs.

[52] U.S. Cl. ............................................... 339/8
[51] Int. Cl. ............................................... H01r 39/28
[50] Field of Search ............................................... 339/5, 8, 6, 9, 215; 308/215

[56] References Cited

UNITED STATES PATENTS

| 588,667 | 8/1897 | Tellefsen et al. | 308/215X |
| 1,266,286 | 5/1918 | Lockwood | 308/215 |
| 2,251,714 | 8/1941 | Onions | 308/215 |
| 3,105,728 | 10/1963 | Seeloff | 339/5 |
| 3,412,364 | 11/1968 | Grawe | 339/5 |

FOREIGN PATENTS

| 531,432 | 8/1955 | Italy | 339/5M |

*Primary Examiner*—Richard E. Moore
*Attorney*—Larson and Taylor

ABSTRACT: An electric conductor bearing arrangement includes a fixed outer race, a shaft-mounted rotatable inner race and a plurality of roller bearing devices for completing a current path therebetween. The bearing devices each include a cylindrical coil spring arranged with the longitudinal axis thereof parallel to the shaft axis. The spring bearings which are transversely compressible compensate for any misalignments by assuming a shape compatible with the existing alignment.

PATENTED MAY 25 1971　　　　　　　　　　　　3,581,267

INVENTOR
ROBERT Z. SCHREFFLER

BY Larson and Taylor
ATTORNEYS

ELECTRIC CONDUCTOR BEARINGS

CROSS REFERENCE TO RELATED APPLICATION

This application is a continuation-in-part of my earlier U.S. Pat. Application Ser. No. 562,956 filed June 30, 1966.

FIELD OF THE INVENTION

The present invention relates to means for conducting electrical current to a rotary element or more particularly to an electrical conductor bearing device for accomplishing this purpose.

BACKGROUND OF THE INVENTION

The problem of providing satisfactory means for conducting electrical current to a rotary element is one of long standing. The problem is encountered in connection with a great number of electrical devices, e.g., in motors, generators, rotating electric signs and beacons, radar installations and the like.

Historically the conduction of electrical current to a rotary component has been accomplished through the conventional slip ring and brush arrangements. In my earlier filed copending application Ser. No. 562,956, filed June 30, 1966, I disclose an electrical conductor bearing device including a rotatable race member, a fixed race member and rotatable bearing means disposed between the races for conducting electrical current therebetween. An electrical circuit is completed through electrical connections to the inner and outer races. This electrical circuit is maintained during rotation by the rotatable bearing means which provides a rolling electrical connection between the fixed race member and the rotatable race member. This system possesses a number of advantages as compared with the conventional brush and slip ring approach including a reduction in maintenance costs and in the amount of necessary downtime.

Bearings used to conduct electrical current are subject to wear and, particularly where there is some slight misalignment between the races or eccentricity in the shaft mounting, to wear unevenly. Wear of this type causes the electrical contact provided by the bearings to deteriorate which results in impairment of the operation of the associated electrical system.

SUMMARY OF THE INVENTION

The present invention provides improved electrical bearing construction for use in a system of the general type described in my earlier application.

In accordance with a presently preferred embodiment of the invention there is provided an improved electrical roller bearing device comprising a rotatable resilient conductive roller member for making rolling, resilient electrical contact between fixed and rotatable races. The roller member preferably comprises a cylindrical coil spring arranged with the longitudinal axis thereof parallel to the axis of the shaft mounting the rotatable race member so that the spring roller may roll between the fixed and rotatable races. The spring roller is traversely compressible and will compensate for any misalignment of the races or of the shaft by assuming a shape compatible with the existing alignment. Conductive lubricants are used to insure the maintenance of good electrical contact between the bearings and the races while at the same time to combat wear of these elements. Thus through the combination of the use of resilient bearings and conductive lubricants continuous good electrical contact is achieved. The lubricants are preferably at least partially liquid and preferably comprise a grease base with a conductive material such as sintered silver dispersed therein. In accordance with a further feature of the invention the roller member further comprises a resilient porous support member for the spring which also serves as a reservoir for the conductive lubricant. In accordance with a further feature of the invention the conductor bearing assemblies are constructed such that a plurality of such assemblies may be mounted on a single shaft and be individually fed from separate sources.

BRIEF DESCRIPTION OF THE DRAWINGS

Other features and advantages of the invention will be apparent upon consideration of the following description taken with the accompanying drawings wherein.

DESCRIPTION OF THE PREFERRED EMBODIMENTS

Figure 1:
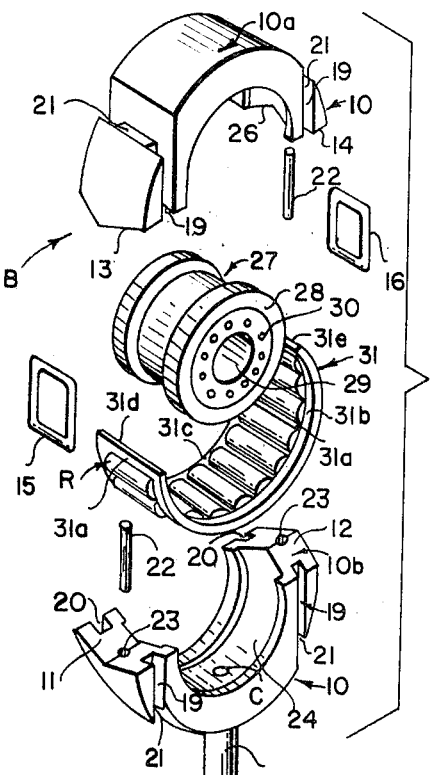
FIG. 1 is an exploded perspective view of a presently preferred embodiment of the invention.
Figure 2:
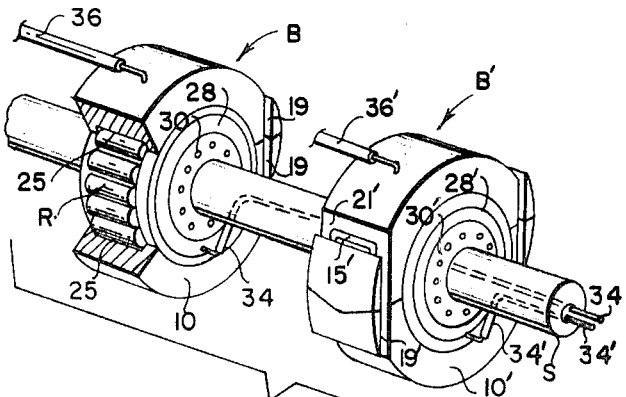
FIG. 2 is a perspective view showing a pair of assembled devices in accordance with FIG. 1 connected to provide conduction of electrical current to a rotary member.

Referring to FIGS. 1 and 2 there is shown an electrical conductor bearing device, generally denoted B, in accordance with a presently preferred embodiment of the invention. Bearing device B includes a split outer race member 10 which comprises a generally semitoroidal upper race member 10a and generally semitoroidal base race member 10b. The end portions 11 and 12 of base race member 10b are of concave V-shape and convex V-shape, respectively, and mate the corresponding reciprocally shaped end portions 13 and 14 of upper race member 10a. Race members 10a and 10b are clamped together by resilient O-rings 15 and 16 which are received in a pair of recesses formed by grooves located in the surfaces of each of the race members 10a, 10b. The grooves include four pairs of vertical grooves 19 and 20 formed on opposite sides of race members 10a, 10b and four transverse grooves 21 formed in the outer surfaces of the races. Grooves 21 connect oppositely located grooves 19, 20 as shown so that when the race members 10a, 10b are assembled (see FIG. 2) a pair of continuous recesses extending around the outsides of the race members 10a, 10b are formed for receiving the O-rings 15, 16. Race members 10a, 10b are aligned by aligning pins 22 each of which fit into an opposing pair of openings (openings 23 of race member 10b being shown) located in race members 10a and 10b and thereby serve to locate and position the two race members with respect to one another.

Race member 10b further includes a portion of a race or track in the form of an annular groove 24 formed in the inner peripheral surface thereof as shown. Race member 10a similarly includes a corresponding groove 26 formed in the inner peripheral surface thereof. With the race members 10a, 10b assembled as shown in FIG. 2, the grooves form a continuous outer race (denoted 25 in FIG. 2) for receiving a plurality of roller devices generally designated R. The construction of roller devices R is described in some detail hereinbelow.

Roller devices R are also received in an inner race in the form of an annular groove 27 formed in the outer peripheral surface of an inner race member 28. Race member 28 is generally cylindrical in form and includes a central longitudinal bore 29. Separate from race member 28 but located within the bore 29 therein is a generally cylindrical insulating member 30 which serves to mount inner race member 28 on a rotary shaft S (FIG. 2) in insulated relationship therefrom. Insulating member 30 is keyed to shaft S through a suitable key and keyway arrangement (not shown) and rotates therewith. Inner race member 28 is fixedly secured to insulating member 30 by suitable means and thus race member 28 rotates with shaft S. Outer race member 10 is nonrotative.

Roller devices R are mounted in a roller cage 31 generally in the form of a split ring or annulus. Cage 31 is constructed of a resilient insulating material and includes a series of connecting members 31a located at spaced intervals about the periphery thereof which connect and separate the opposing annular marginal portions 31b, 31c of the cage. The roller devices R are of generally cylindrical shape and lie between the opposed marginal portions of cage 31 with their longitudinal axes parallel to the axis of rotation of the shaft S. The roller devices R are individually rotatably supported by pin members (not shown in FIGS. 1 and 2 but described in connection with FIG. 3) extending centrally through the longitudinal axes thereof. The rollers R are, as stated, individually rotatable and are retained in spaced relationship about the periphery of the cage 31. Although shown for illustrative purposes in a "sprung" relationship, the opposing end portions 31d and 31e adjacent the transverse split therebetween are normally resiliently biased together to form a complete or nearly complete annulus. Thus cage 31 may be snap-fit onto inner race member 28 by merely spreading the opposing end portions 31d, 31e to permit insertion of race members 28 and then releasing these end portions so that they assume their normal positions.

It will be appreciated from the foregoing that the conductor bearing assembly of the invention may be easily assembled and disassembled. Outer fixed race member 10 may be disassembled by removing resilient O-rings 15 and 16 and lifting upper portion 10a from lower portion 10b. With upper portion 10a removed access is provided to cage 31 and individual rollers R may be removed for inspection, cleaning or replacement purposes.

Referring to FIG. 2 the conductor bearing devices B and B' are illustrated in their assembled form. Bearing devices B and B' are substantially alike and elements of bearing device B' have been given the same numbers as corresponding elements in bearing device B with primes attached. Lead conductors 36 and 34 attached to outer race member 10 and inner race member 28, respectively, provide a current path through conductor arrangement B. Conductor 34 extends through an opening in shaft S and is positioned in a longitudinal bore therein as shown in FIG. 2. Conductor 34 (along with corresponding conductor 34') rotates with shaft S while conductor 36 (and conductor 36') remains fixed. Conductors 34 and 34' are connected to the rotary element (not shown) to which current is to be supplied. An alternate means for conducting electrical current to member 10 is represented by rigid rodlike conductor 37 (FIG. 1) affixed to race member portion 10a and extending downwardly therefrom. Conductor 37 may also serve in mounting fixed race member 10 and preferably includes a central channel having an opening C through which lubricant or a cooling gas may be introduced in proximity to the rollers R.

With race members 10 and 28 being constructed of a conductive material and with rollers R providing current conduction between members 10 and 28, it will be appreciated that the current path provided by conductors 34 and 36 is completed through conductor bearing devices B and B'. For example, considering conductor 36 as an input conductor, a circuit is completed from conductor 36 through bearing device B and conductor 34 to the rotary element and back through conductor 34', bearing device B' and output conductor 36'. In accordance with an important feature of the present invention the arrangement of the inner and outer races and the insulating mounting therefor permits a plurality of conductor devices to be mounted on a single shaft S and be separately fed and controlled. It will be appreciated that conventional arrangements having shaft takeoffs i.e., one of the conductor leads connected to the rotary shaft or a member in direct electrical contact with the shaft, cannot provide independent control for a plurality of rotary components.

Figure 3:
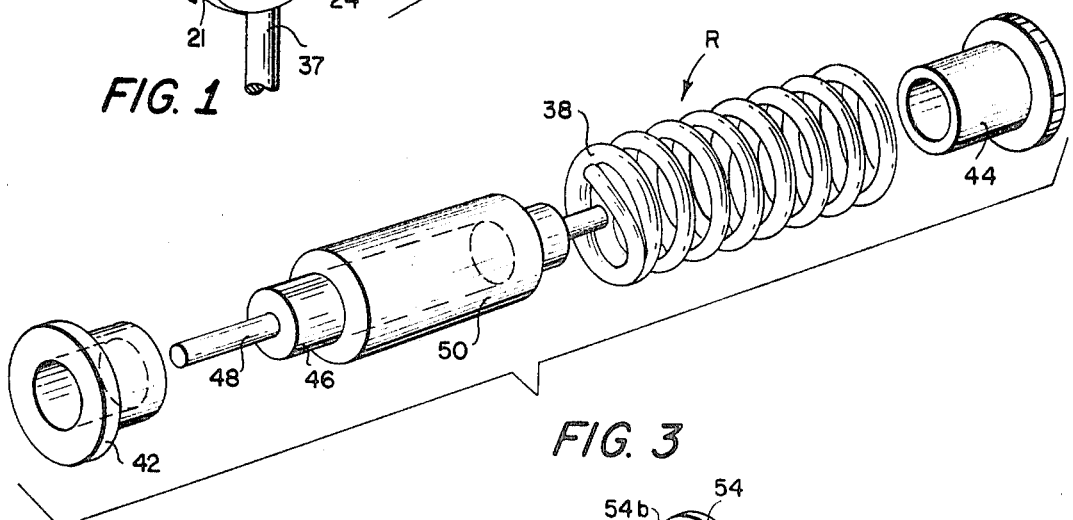
FIG. 3 is an exploded perspective view of a roller device which may be utilized in the embodiments of FIGS. 1 and 2.

Referring to FIG. 3, the details of construction of a roller device R like those utilized in the arrangements of FIGS. 1 and 2 are shown. Roller device R includes a cylindrical coil spring 38 mounted on mounting assembly which includes a pair of end members 42 and 44 each having a bore therein for receiving opposite ends of a central cylindrical member 46. Central member 46 itself includes a longitudinal bore adapted to receive a rod member 48 utilized in mounting roller R in the cage 31 as described hereinbefore. The mounting assembly includes yet another cylindrical member 50 which includes a longitudinal bore therein adapted to receive central member 46. Member 50 is constructed of porous material and in its assembled position supports spring 38.

In accordance with another important feature of the invention the porosity of spring support member 50 permits the retention of a liquid or semiliquid lubricant for the roller bearing R and thus support member 50 serves as a lubricant reservoir. It is noted that transverse compression of spring 38 will cause similar compression of support member 50 and partial release of lubricant.

A number of lubricants have been found to be particularly suitable for use with the roller bearing devices R of the invention. These lubricants share the feature of being more conductive than conventional lubricants and thus aid in providing and maintaining a good electrical connection between the spring roller bearings R and the race members 10 and 28. In general these lubricants include a conductive material dispersed in a grease base film. An example of such a lubricant is "Andok M 350" with sintered silver dispersed therein.

In accordance with perhaps the most important single feature of the invention the spring bearings R obviate the need for the critical alignment of the bearings and races required in conventional arrangements. Spring bearings R will, because they are transversely compressible, in effect, compensate for any misalignment of the races by assuming a form compatible with the existing alignment. This feature also obviates the need for absolute centering of the rotatable shaft and, in general, greatly reduces installation and engineering costs. The use of resilient bearings together with the use of a conductive lubricant ensures that a constant area of contact is maintained between the races. This combination also combats wear in component parts of the bearing assembly. Thus it will be appreciated that the combination of these two features of the invention cooperate to overcome the problems encountered in the use of prior art current-carrying bearings.

It is noted that end members 42 and 44 of roller R may be constructed of an electrically conductive material such as metal or of a nonconductive material such as plastic.

Figure 4:
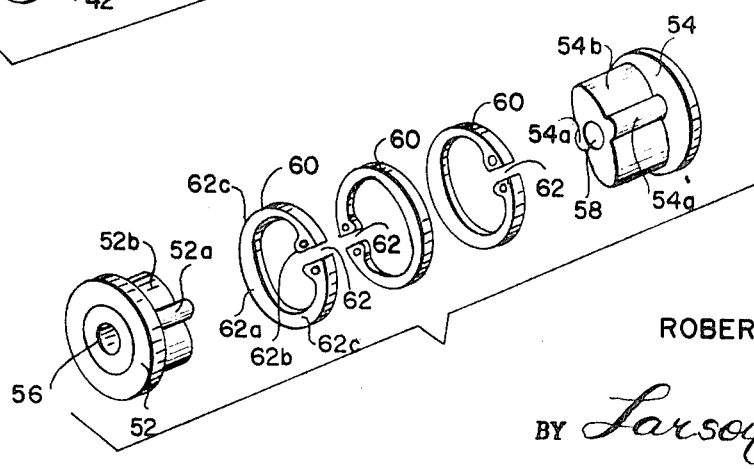
FIG. 4 is an exploded perspective view of an alternate roller device embodiment.

Referring to FIG. 4, an alternate embodiment denoted R' of the roller device R of FIG. 3 is shown. Roller R' includes a pair of end ferrules 52 and 54 which include respective central shaft axle bores 56 and 58 therethrough adapted to receive a supporting shaft (not shown) as described hereinabove. A series of spring rings 60 (three of which are shown in FIG. 4) are captured between the ferrules 52, 54 when these ferrules are assembled in facing center-to-center alignment. Spring rings 60 each include a circumferential opening 62 which provides flexibility and resiliency. The circumferential openings 62 are, when assembled, arranged on alternative opposite sides of the roller device R' as shown in FIG. 4. End ferrule 52 includes a pair of centering lands 52a (one of which is shown) which extend outwardly of a generally elliptical support member 52b in a direction perpendicular to the major axis thereof while end ferrule 54 similarly includes a pair of lands 54a extending perpendicularly outwardly of elliptical support member 54b. With the roller R' assembled, portions of springs 60 are received on corresponding supporting portions of end ferrules 52 and 54 respectively. For example, considering the lowermost of the springs 60 as shown in FIG. 4, the thickened portion 62a of the spring, positioned opposite opening 62, bears against one of the lands 52a while the portions 62b of the spring which form opening 62 bear against the second of these lands. Opposite ends of elliptical support 52b engage first and second oppositely disposed spring portions 62c which are of relatively reduced cross section as compared with portion 62a. With this arrangement a number of voids are formed between the spring 60 and the surfaces of lands 52a and support member 52b. These voids, together with similar voids formed between the remainder of the springs 60 and the corresponding supporting portions of the ferrules 52, 54, are filled with a hardinable flexible spongy potting resin such as a silicone or urethane resin. The cooperation between the potting resin and the springs 60 is similar to that described hereinabove in connection with the spring and resilient support member of FIG. 3.

It will be appreciated by those skilled in the art that the embodiments of the invention shown and described are subject to modification without departing from the spirit of the invention. Thus it will be understood that the scope of the invention is not limited to the exemplary embodiments shown but rather by the subjoined claims.

I claim:

1. An electrical system comprising a rotatable race member fixedly mounted on a rotatable shaft, insulating means for insulating said race from said shaft, means connected to said rotatable race member for conducting electrical current thereto, a fixed race member mounted in spaced relationship to said rotatable race member, means connected to said fixed race member for conducting electrical current thereto and roller means disposed between said rotatable race member and said fixed race member for completing an electrical circuit between said electrical current conducting means, said roller means comprising a plurality of individual roller devices, at least one of said roller devices comprising a rotatable resilient conductive member for effecting flexible rolling electrical contact between said rotatable race member and said fixed race member whereby any existing nonalignment between the race members or deformation in the said race members is compensated for and means for fixedly supporting said roller devices in axial alignment.

2. An electrical system in accordance with claim 1 wherein said at least one roller device comprises a spring member.

3. An electrical system in accordance with claim 2 wherein said spring member comprises a cylindrical coil spring, the longitudinal axis of said spring being parallel to the longitudinal axis of said rotatable shaft, said system further including porous resilient support means for supporting said springs.

4. An electrical system in accordance with claim 1 wherein said at least one roller device comprising a spring member and a porous resilient member for supporting said spring member.

5. An electrical system in accordance with claim 4 further comprising an at least partially liquid, conductive lubricant disposed between said race members, said porous supporting member constituting means for retaining a portion of said lubricant.

6. An electrical system in accordance with claim 5 wherein said spring member comprises a cylindrical coil spring and said supporting member comprises a cylindrical member, the longitudinal axis of said spring and said cylindrical member extending parallel to the longitudinal axis of said shaft.

7. An electrical system in accordance with claim 1 further comprising a conductive lubricant disposed between said race members.

8. An electrical system in accordance with claim 1 further comprising a further rotatable race member fixedly mounted on said shaft at a location spaced from the first-named rotatable race member, means for insulating said further rotatable race member from said shaft, a further fixed race member mounted in spaced relationship to said further rotatable race member, further roller means disposed between said further race members for conducting electrical current therebetween and means separate from the first-named current conducting means for conducting electrical current to said further rotatable race member and to said further fixed race member.

9. An electrical system in accordance with claim 1 wherein at least one of said roller devices comprises a plurality of spring members, each of said spring members being in flexible rolling electrical contact with both said inner and outer races.

10. An electrical system in accordance with claim 5 further comprising means including an inlet opening in said fixed race member for forcibly introducing said conductive lubricant between said races.